May 12, 1925.
O. N. WISWELL
SWINGSPOUT ATTACHMENT FOR CONTAINERS
Filed May 2, 1922
1,537,399
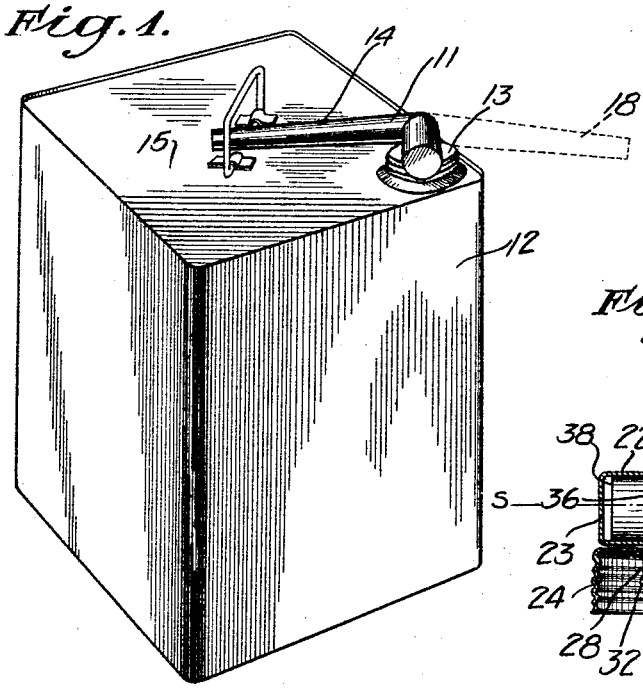
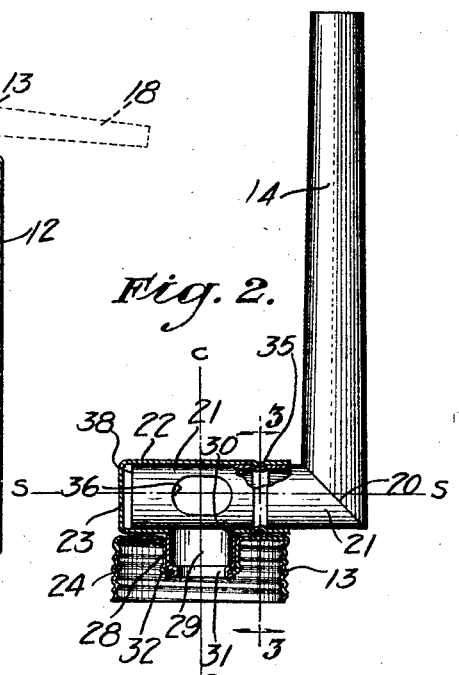
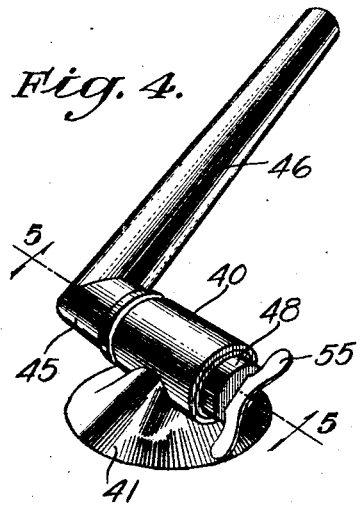
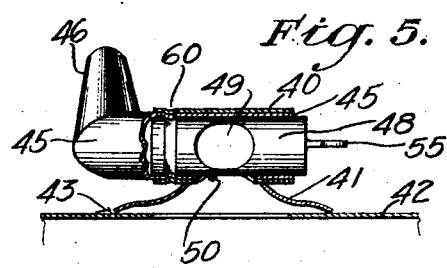
INVENTOR:
OZRO N. WISWELL,
BY
ATTORNEYS.

Patented May 12, 1925.

1,537,399

UNITED STATES PATENT OFFICE.

OZRO N. WISWELL, OF LOS ANGELES, CALIFORNIA, ASSIGNOR TO SWINGSPOUT MEASURE CO., A CORPORATION OF CALIFORNIA.

SWINGSPOUT ATTACHMENT FOR CONTAINERS.

Application filed May 2, 1922. Serial No. 557,949.

*To all whom it may concern:*

Be it known that I, OZRO N. WISWELL, a citizen of the United States, residing at Los Angeles, in the county of Los Angeles, State of California, have invented a new and useful Swingspout Attachment for Containers, of which the following is a specification.

It is an object of my invention to provide a swingable spout for containers which may be swung from a withdrawn, flow restricting position to an extended, flow permitting position; and to provide such a spout with a simple means for mounting the spout upon a container and with a simple form of valve.

It is a further object of my invention to provide a swingable spout which rotates about an axis parallel to but outside of the wall of the container to which the spout is attached.

It is a further object of my invention to provide a detachable swingable spout which may be secured to the regular threaded opening through which the can is ordinarily filled.

It is a further object of my invention to provide a swingable spout for a container which may be revolved about either of two axes which are preferably at right angles to each other.

It is a further object of my invention to provide a swing spout with a separate valve so that the flow of liquid through the spout may be regulated without altering the position of the spout.

It is a further object of my invention to provide a temporary form of seal for all joints.

Other objects and advantages will be made evident hereinafter.

Referring to the drawing, which is for illustrative purposes only,

Fig. 1 is a perspective view of a container equipped with my invention.

Fig. 2 is an elevation of the pouring device shown in Fig. 1, certain parts thereof being shown in section to more fully illustrate the invention.

Fig. 3 is a sectional view through the interlocked tubular members forming the valve element of the device, and is taken substantially upon a plane represented by the line 3—3 of Fig. 2.

Fig. 4 is a perspective view of another form of my invention.

Fig. 5 is a sectional view taken substantially upon a plane represented by the line 5—5 of Fig. 4.

The pouring device 11 shown mounted upon the container 12, illustrated in Fig. 1, consists essentially of a mounting 13 which swingably supports a tubular pouring spout 14. In this view, the spout 14 is shown swung back upon the top 15 of the container, in which position no oil can escape through the spout 14, as will be made evident hereinafter. When it is desired to pour oil from the container 12, the spout 14 is revolved upon the mounting 13 and caused to assume an extended position, indicated by the dotted lines 18.

In constructing the pouring device, I prefer to employ the formation shown in Fig. 2. The spout 14 connects at 20 to a tubular member 21 which extends into a closely fitting sleeve 22 having a closed end 23. The spout can then be revolved about the axis *s—s* of the sleeve 22. The sleeve 22 is also so mounted upon a mounting 13, which in this instance consists of a threaded cap 24, that the sleeve 22 and the spout 14 may also be revolved about the axis *c—c* of the cap 24. The cap 24 is provided with an inwardly turned cylindrical wall 28 into which extends a collar 29 that is joined to the sleeve 22 and is in communication with an opening 30 therein, the lower end 31 of the collar 29 being crimped over the inwardly turned edge 32 of the circular wall 28 of the cap 24 so that a liquid tight, but revolvable joint is formed. The tubular member 21 is held in the sleeve 22 by depressing a circular corrugation 35 into the walls of both the member 21 and the sleeve 22, as shown in the figure, and the opening 36 in the member 21 is so situated that when the spout is in the position indicated at 18 in Fig. 1 the opening 36 will coincide with the opening 30 in the sleeve 22 and a free flow of liquid may pass through the pouring spout. It will be perceived that it is immaterial to the action of the device whether the closure of the back end of the passage 37 formed by the member 31 and the sleeve 22 is accomplished as shown at 23 or by closing the end 38 of the tubular member 21.

It will be noted that since the spout 14 can be swung about either the axis *s—s* or *c—c*, that it is universally adjustable with relation to the container and can be turned into any desired position. It will also be evident that by using a standard size of screw cap 13 the swingable spout and its valve may be applied to any container having a standard cap by simply removing the standard cap and screwing my device in place.

In the form of my invention shown in Figs. 4 and 5, an outer sleeve 40 is associated with a stamped mounting plate 41 which may be secured upon the top 42 of a container by running solder around the edge 43. A tubular member 45, from which a spout 46 extends, is placed within the sleeve 40 and a valve cup 48, having an opening 49 therein, is inserted into the member 45 from the unobstructed end thereof. When the spout 46 is turned into the pouring position, as in Fig. 5, openings provided in the sleeve 40 and the member 45 coincide, as shown at 50, to permit a flow of liquid through the spout, it is then only necessary to revolve the valve cup to bring the opening 49 into a position of coincidence with the openings in the sleeve 40 and the member 45 by turning the handle 55.

The sleeve 40, the tubular member 45, and the cup 48 are held together, as in the previously described form of my invention, by a rolled circumferential corrugation 60. By adjusting the position of the opening 49 in the valve cup 48, it is possible to regulate the flow of oil from the container, and it is further possible to shut off the oil before removing the spout 46 from the opening of the receptacle into which oil has just been poured, thus preventing wastage of oil by spilling.

For the purpose of providing a temporary seal to prevent leakage of oil during shipment, the various moving parts, such, for example as the cap 13 and its associated parts, are dipped while hot in hot paraffine; they are then adjusted and secured to the container in the position they are to be shipped in the paraffine, congealing in this position and forming an oil tight joint. This paraffine, however, is not of sufficient mechanical strength to prevent subsequent movement of any of the parts when it is desired to use the device.

I claim as my invention:

1. In a device of the character as disclosed, the combination of: a spout; a tubular member attached at an angle to and forming a continuation of said spout, said tubular member being provided with an opening; a sleeve in which said tubular member is turnably mounted, said sleeve being provided with an opening adapted to register with said opening in said tubular member; and means for turnably mounting said sleeve on a container with the opening in said sleeve in communication with said container, and with the axis of turning movement of said sleeve at an angle to the axis of turning movement of said tubular member.

2. In a device of the character disclosed, the combination of: a spout; a tubular member attached at an angle to and forming a continuation of said spout, said tubular member being provided with an opening; a sleeve in which said tubular member is turnably mounted, said sleeve being provided with an opening with which the opening in said tubular member is adapted to register; a cap adapted to fit over the outlet of a container, said cap having an opening in the top thereof; a circular wall depending from the top of said cap around the opening in said top; a circular collar depending from said sleeve into said circular wall and turnably mounted in said circular wall, and means for holding said collar in said circular wall.

3. In a device of the character as disclosed, the combination of: a spout; a tubular member attached at an angle to and forming a continuation of said spout, said tubular member being provided with an opening; a sleeve in which said tubular member is turnably mounted, said sleeve being provided with an opening with which the opening in said tubular member is adapted to register; a cap adapted to fit over the outlet of a container, said cap having an opening in the top thereof; a circular wall depending from the top of said cap around the opening in said top; a circular collar depending from said sleeve into said circular wall and turnably mounted in said circular wall, the ends of said circular wall and said collar being crimped together to hold said collar and said wall.

4. In a swinging spout construction, the combination of: a spout; a tubular member attached at an angle to, and forming an extension of, said spout; a sleeve in which said tubular member is turnably mounted; and means for turnably mounting said sleeve on a container so that the axis of turning movement of said sleeve is at an angle to the axis of turning movement of said tubular member.

5. In a swinging spout construction, the combination of: a spout; a tubular member attached substantially at right angles to, and forming an extension of, said spout; a sleeve in which said tubular member is turnably mounted; and means for turnably mounting said sleeve on a container so that the axis of turning movement of said sleeve is substantially at right angles to the axis of turning movement of said tubular member.

In testimony whereof, I have hereunto set my hand at Los Angeles, California, this 26th day of April, 1922.

OZRO N. WISWELL.